W. E. SMITH.
CULTIVATOR.
APPLICATION FILED OCT. 19, 1912.
1,087,991.
Patented Feb. 24, 1914.
2 SHEETS—SHEET 2.
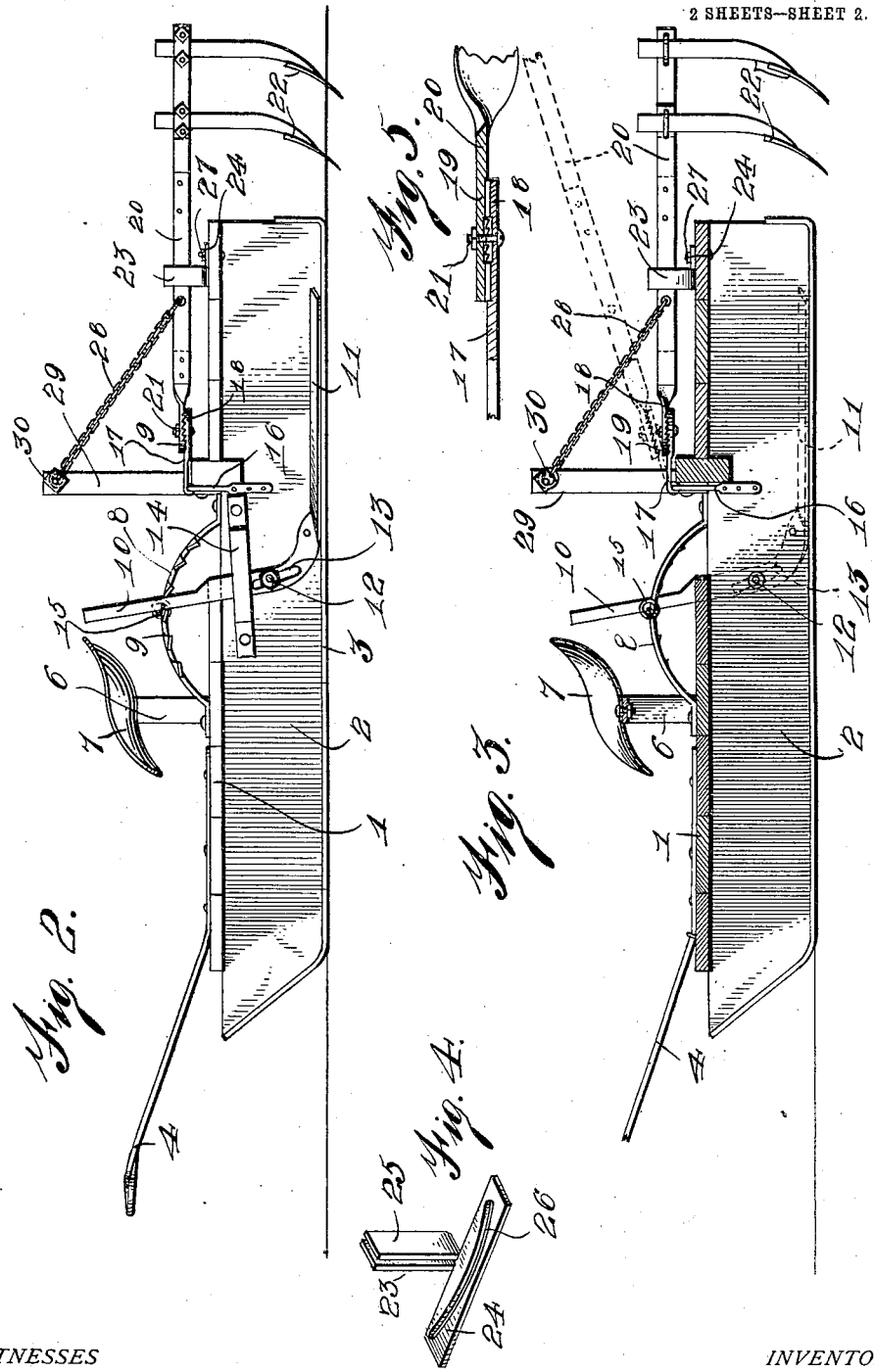
WITNESSES
INVENTOR
Warner E. Smith
By E. E. Vrooman, his Attorney

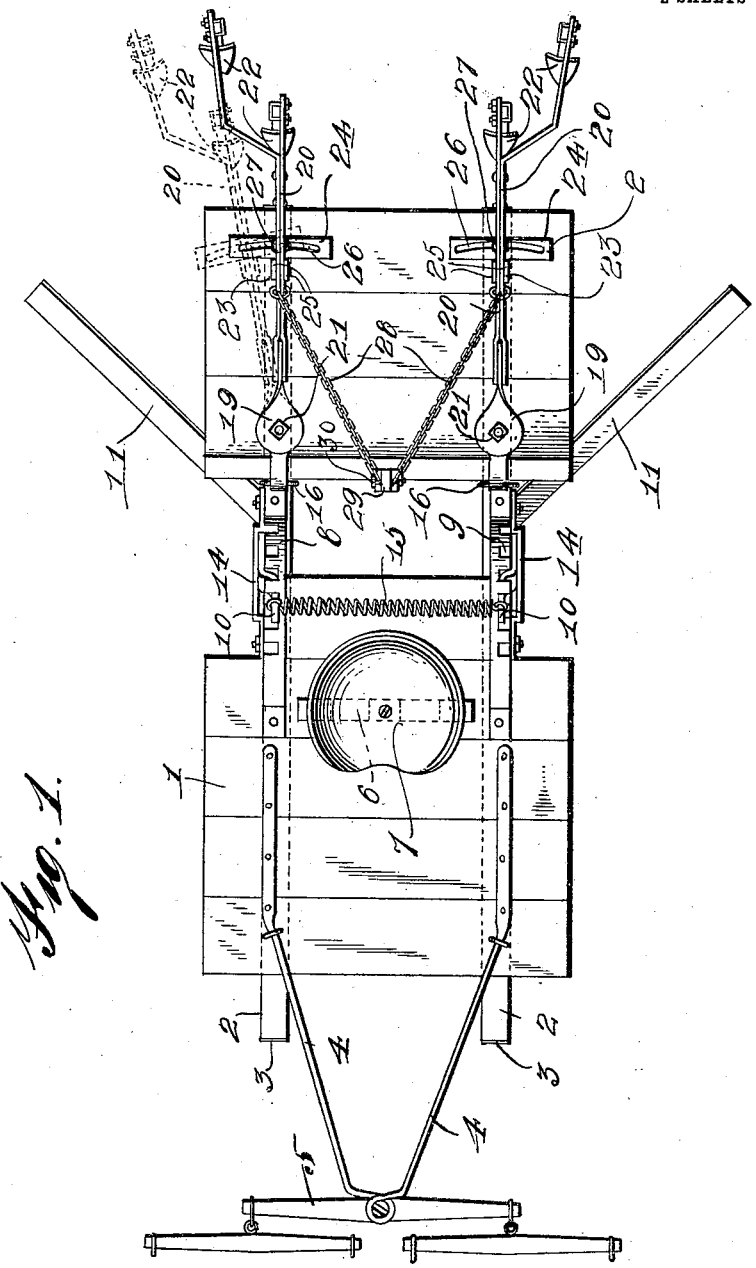

UNITED STATES PATENT OFFICE.

WARNER E. SMITH, OF RULE, TEXAS.

CULTIVATOR.

1,087,991. Specification of Letters Patent. Patented Feb. 24, 1914.

Application filed October 19, 1912. Serial No. 726,801.

*To all whom it may concern:*

Be it known that I, WARNER E. SMITH, a citizen of the United States, residing at Rule, in the county of Haskell and State of Texas, have invented certain new and useful Improvements in Cultivators, of which the following is a specification, reference being had therein to the accompanying drawing.

This invention relates to cultivators and has for its object the production of a cultivator for cleaning the beds where the plants are planted down deep in the ground so as to rid the surface of the ground from weeds which grow up prior to the appearance of the plants or crops which have been sown in the field.

Another object of the invention is the production of an efficient mechanism where the cultivator blades may be adjusted to different angles and the weed cutting knives may also be adjusted to different heights relative to the form of the sled.

With the above and other objects in view this invention consists in certain novel combinations, constructions and arrangement of parts as will be hereinafter fully described and claimed.

In the accompanying drawings:—Figure 1 is a top plan view of the cultivator. Fig. 2 is a side elevation thereof. Fig. 3 is a central longitudinal sectional view of the cultivator. Fig. 4 is a detail perspective view of the adjusting clip for holding the harrow blade supporting arms in an adjusted swung position. Fig. 5 is an enlarged view through the connecting member for the harrow blade supporting arm and the connecting link for securing the arm to the frame of the harrow.

By referring to the drawings by numerals it will be seen that 1 designates the platform of the sled which is supported by the usual runners 2 having metallic protector bands 3 upon their lower edges. To the front end of the platform 1 is connected a draft connecting member 4 to which the double tree or other draft connection 5 is secured. A seat supporting brace 6 is also carried by the front platform and upon this seat supporting brace 6 is mounted a seat 7. A rack member 8 is carried upon each side of the sled and is provided with rack teeth 9 upon its outer edge, which rack teeth are adapted to be engaged by the handles or arms 10 of the cutting knives 11. These handles or arms 10 are connected to the sides of the runners 2 by having the nuts 12 pass through the longitudinally extending slots 13 formed in the arms 10 of the knives 11. It will be seen that the knives 11 may be adjusted vertically relative to the runners 2 by means of the structure just described.

A guide bracket 14 straddles each of the arms 10 and these arms 10 are connected by means of a coil spring 15 which coil spring passes transversely of the platform 1. This coil spring 15 is adapted to hold the arms 10 in engagement with the rack teeth 9 of the rack members 8 so as to hold the knives 11 in an adjusted swung position. It will be seen that by swinging the arms 10 in the manner just described and placing the same in the teeth 9, the knives 11 may be held in the desired pitched relation to efficiently cut the weeds just above the ground. It will be further understood that the knives may be adjusted vertically of the runners 2 so as to prevent the knives from cutting into the ground in case the ground should be soft and the runners should sink in the ground below their lower edges. The purpose of these knives is to cut the weeds just above the ground and it is, therefore, advantageous to have the knives adjustable so as to prevent the knives from becoming unnecessarily dull by coming in contact with the ground.

A yoke member 16 straddles each runner 2 near its rear end and to each yoke member is connected a link 17 so as to allow the link member to be swung upwardly to any desired position. This link member 17 is provided with a circular head 18 having a toothed face upon its upper edge for engaging the toothed face of the lower edge of the head 19 of the drag bars 20. A bolt 21 passes through the head 18 and the head 19 for holding the drag bars 20 in an adjusted position to prevent the drag bars from being swung laterally relative to the platform 1. Harrow blades 22 are supported by the rear ends of the drag bars 20 as illustrated in Figs. 1 and 3. Harrow arm receiving clips 23 are carried by the rear end of the platform 1 and these clips 23 comprise an elongated body 24 having integral upwardly extending parallel arms 25 for receiving the drag bars 20 and holding the same against swinging movement. Each of the clips 23 is provided with an arcuate groove 26 through which passes a bolt 27 for holding the clip 23 in an adjusted position. It should be understood that these clips may be swung upon the platform 1 to such a position as to have the harrow blades or harrow supporting drag bars 20 extend at any desired angle relative to the platform 1.

Chains 28 are connected to the drag bars 20 and have their upper ends connected to a standard 29 by means of the bolt 30, and it should be understood that these chains may be so adjusted as to support the drag bars up at an operative position or to the position shown by the dotted lines in Fig. 3.

From the foregoing description it will be seen that an efficient and simple apparatus has been produced whereby the weed cutting knives may be adjusted to accommodate the different conditions of the ground over which the sled is passing and also that the drag bars may also be swung laterally and vertically of the platform 1 so as to be brought to the desired positions. It will be further obvious that a very simple and efficient device has been produced which may be manufactured at a minimum cost.

Having thus described the invention what is claimed as new, is:—

1. A cultivator comprising runners, a platform carried thereby, vertically extending yoke members carried by said runners, link members connected to said yoke members and capable of being swung vertically thereof, drag bars secured to said link members, rack teeth formed upon said links and said drag bars, the teeth of said links adapted to engage the teeth of said drag bars, bolts passing through said links and drag bars for holding said drag bars in adjusted position, an elongated body secured adjacent each side of said platform, each body provided with vertically extending parallel clips, said drag bars adapted to fit between said clips for preventing said bars from swinging laterally.

2. A cultivator comprising a frame, yoke members secured to said frame, links secured to said yokes and adapted to swing vertically thereon, drag bars pivotally secured to said links and capable of swinging laterally thereto, whereby said drag bars have free vertical movement and are capable of swinging laterally, an elongated body adjustably secured to said frame, said body provided with vertically extending parallel clips, said drag bars adapted to fit between said clips for holding said drag bars in adjusted position, each of said elongated bodies provided with a curved slot, a bolt passing through said slot for holding said body in adjusted position, said body capable of moving upon said bolt for moving said clips and drag bars laterally upon said frame, and chains carried by said frame and engaging said drag bars for holding the same in an inoperative position.

In testimony whereof I hereunto affix my signature in presence of two witnesses.

WARNER E. SMITH.

Witnesses:
 G. KLINE,
 A. C. FOSTER.

---

Copies of this patent may be obtained for five cents each, by addressing the " Commissioner of Patents. Washington, D. C."